United States Patent [19]

Bratten

[11] Patent Number: 5,466,380

[45] Date of Patent: Nov. 14, 1995

[54] SUMP SYSTEM AND METHOD FOR COLLECTING LIQUID TO BE FILTERED

[76] Inventor: Jack R. Bratten, 5970 St. James Dr., West Bloomfield, Mich. 48393

[21] Appl. No.: 262,143

[22] Filed: Jun. 20, 1994

[51] Int. Cl.[6] .......................... B01D 37/00; B01D 36/00
[52] U.S. Cl. .................. 210/741; 210/744; 210/805; 210/808; 210/104; 210/123; 210/168; 210/196; 210/418; 210/416.5; 409/137; 184/6.14; 184/103.2; 137/399; 137/563; 137/565; 137/572; 137/907
[58] Field of Search .................. 137/606, 607, 137/563, 565, 565.1, 572, 907, 587.5, 399; 184/6.14, 103.2; 409/137; 408/56; 210/86, 104, 120, 123, 137, 168, 194, 418, 416.5, 739, 741, 744, 805, 808, 196

[56] References Cited

U.S. PATENT DOCUMENTS

| | | | |
|---|---|---|---|
| 3,897,335 | 7/1975 | Brandt | 210/167 |
| 3,954,611 | 5/1976 | Reedy | 210/168 |
| 4,139,464 | 2/1979 | Coward | 210/168 |
| 4,233,157 | 11/1980 | Miller | 210/387 |
| 4,325,663 | 4/1982 | Lee | 210/168 |
| 5,230,793 | 7/1993 | Lenhart et al. | 210/167 |
| 5,380,446 | 1/1995 | Bratten | 210/805 |

*Primary Examiner*—Robert A. Dawson
*Assistant Examiner*—Robert James Popovics
*Attorney, Agent, or Firm*—John R. Benefiel

[57] ABSTRACT

A sump system and method for collecting liquid from a number of locations includes a series of sumps each collecting liquid at a particular location, and a central sealed collection tank drawing liquid from all of the sumps by overhead draw pipes. A single large capacity pump pumps liquid back to filtration equipment, with a predetermined vacuum level maintained in the tank by opening and closing an outlet valve between the pump and the filtration equipment. The collection tank may be initially filled from an overhead clean supply header.

7 Claims, 1 Drawing Sheet

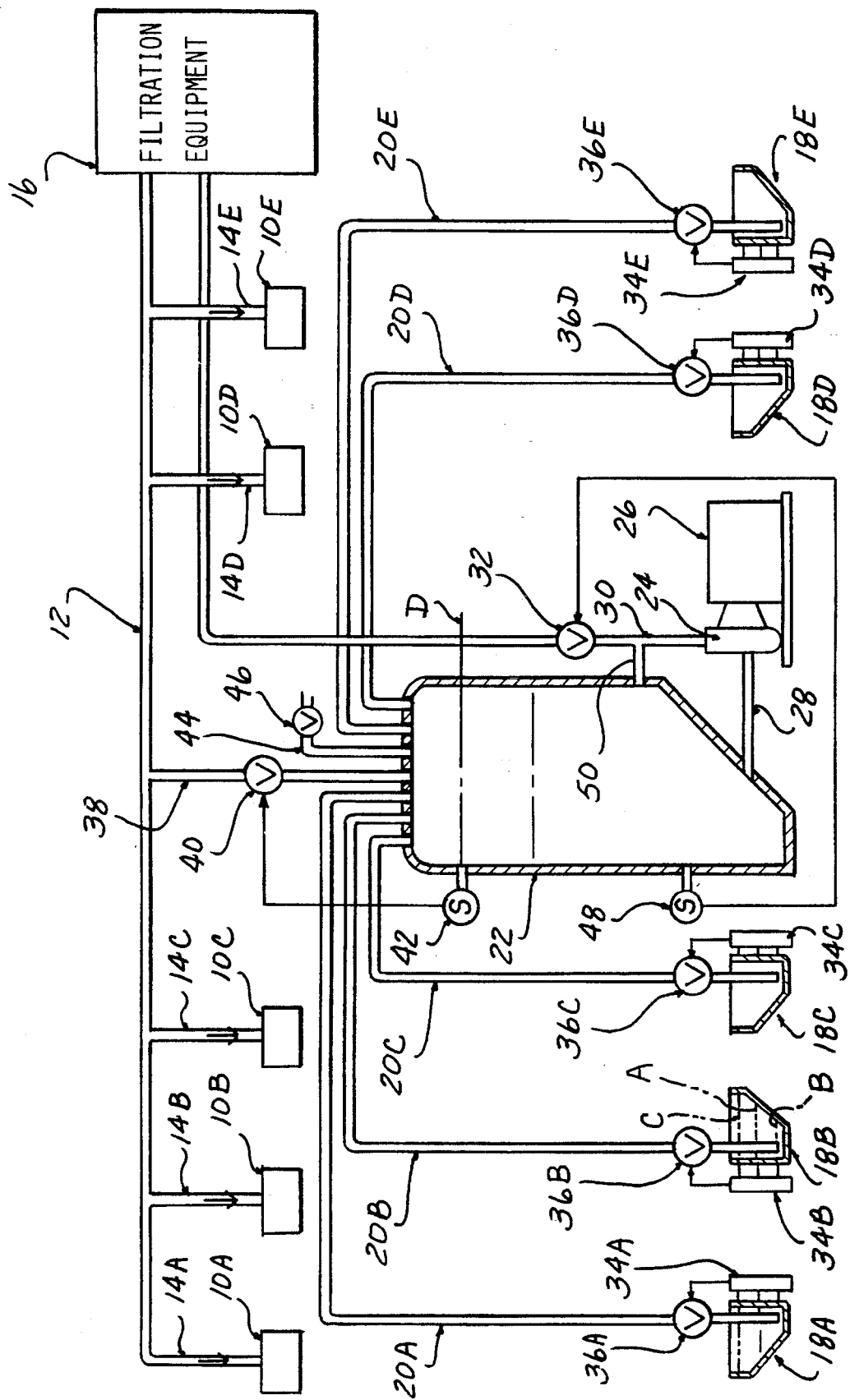

SUMP SYSTEM AND METHOD FOR COLLECTING LIQUID TO BE FILTERED

BACKGROUND OF THE INVENTION

1. Field of the Invention

This invention concerns the collection of liquids to be filtered in a filtration system from a number of different locations.

2. Description of the Prior Art

Industrial filtration equipment is often employed to filter coolants directed at the cutting tools during the machining process. The coolant, metal chips, and other debris generated are collected in a sump and are circulated to the filtration equipment. This coolant flow has in the past been accomplished by flow in so-called velocity trenches, which are below grade concrete, steel lined channels which direct the dirty coolant liquid, chips, and debris back to the filtration equipment.

In recent years, below grade concrete, steel lined trenches have become disfavored since undetected leaks may occur, sometimes causing considerable contamination of the soil beneath the plant.

Copending U.S. application Ser. No. 08/131,298 filed on Oct. 8, 1993 now U.S. Pat. No. 5,380,446, by the present inventor describes a vacuum collection system using in-line filter units. This approach requires pressurized filters, which are not currently in widespread use in this field. Rather, open-topped tank filters are typically employed.

Above grade piping networks have also been used, in which a pump is associated with each sump, pumping the collected liquid back to a conventional filtration equipment via overhead pipes.

There are several disadvantages to this latter approach.

Firstly, having an industrial pump at each sump requires the wiring of each pump and starter with 440 volt lines. There are typically a large number of sumps involved with a typical installation, and thus involving substantial costs, particularly if a spare pump is specified for each sump so that the system need never be shut down for maintenance.

The extra pump at each sump increases the size of the sump, and also makes it impractical to collect liquid beneath each wing base in a transfer line as the pumps cannot be fit beneath the base.

The individual relatively small capacity pumps are not as durable as large capacity industrial pumps, creating a maintenance burden, particularly since these small capacity pumps, with their relatively tight clearances tend to become clogged with the machining chips.

SUMMARY OF THE INVENTION

The present invention comprises a sump system including a series of relatively small volume individual sumps all communicating with a central large volume sealed collection tank. A large capacity pump has its suction side connected to the central collection tank and its outlet to a conventional filtration system.

The collection tank has a fill inlet connected to the clean supply header via a fill valve, which opens at start-up, with a vent opening to allow filling the collection tank with clean liquid to a predetermined level, after which the fill valve and vent are closed.

The large capacity pump is then turned on, pumping down the sealed collection tank by flow back to the filtration equipment to establish a predetermined vacuum level, which when reached closes an outlet valve controlling flow to the filtration equipment causing the pump to recirculate its output back into the central collection tank.

The individual sumps each have level controlled outlet valves, and upon opening, the vacuum in the central tank draws liquid into an overhead draw pipe and into the central collection tank.

Upon decline of the vacuum in the collection tank to a predetermined minimum level, the pump outlet valve is reopened to pump out liquid to the filtration equipment until the predetermined vacuum level is again achieved.

Upon system shutdown, the individual sumps and central collection tank are pumped out to the filtration equipment, preparatory to another start-up cycle.

DESCRIPTION OF THE DRAWING

The FIGURE is a diagrammatic representation of a sump system according to the present invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting inasmuch as the invention is capable of taking many forms and variations within the scope of the appended claims.

Referring to the Figure, the present invention is concerned with filtration of liquid coolant supplied to a series of machine tools 10A, 10B, 10C, 10D, 10E each of which is supplied with clean filtered coolant via an overhead clean supply header 12, via a corresponding series of drops 14A–14E.

The clean liquid in the supply header 12 comes from filtration equipment system 16, which may be of any of various conventional types.

A series of satellite individual sumps 18A–18E are provided, each located to receive and collect coolant and chips from a respective machine tool 10A–10E.

The sumps 18A–18E would typically be variously sized to collect the coolant flow from the particular associated machine tool. For example, sump 18A might be sized to receive 25 gallons per minute, sump 18B 100 gpm, sump 18C 250 gpm, sump 18D 25 gpm, and sump 18E 100 gpm.

Draw pipes 20A–20E each extend upwardly from a terminal end within an associated sump 18A–18E.

The draw pipes 20A–20E extend overhead to the top of a large sealed central collection tank 22, pipes 20A–20E passing into the tank interior, sealed to the tank top.

A large capacity industrial pump 24 is driven by a multiple horsepower electric motor 26 has its intake 28 connected to the bottom of the sealed collection tank 22 and its outlet 30 connected, via a solenoid operated outlet valve 32, to the filtration equipment 16.

Each sump 18A–18E has its own level control switch 34A–34E controlling an associated outlet valve 36A acting to open the associated outlet valve 36A–36E when the level "A" is reached, and close its outlet valve 36A–36E when the level is reduced to "B". An emergency high system shutoff can be included responsive to an imminent overflow condition at level "C" within each sump 18A–18E.

The central collection tank 22 is enabled to receive flow from the clean supply header 12 via drop 38 and fill valve 40.

A level control switch 42, responsive to level "D" being reached, controls opening of fill valve 40 during the start-up mode only.

A vent tube 44 is also opened by opening of venting valve 46 during start-up filling of the collection tank 22.

A vacuum switch 48 senses the level of vacuum in the sealed collection tank 22 and controls the operation of the pump motor 26 and outlet valve 32.

The capacity of the central collection tank 22 and pump 24 is designed to be able to handle the combined flow from all of the individual sumps 18A–18E. For the examples given, the sealed collection tank 22 would have a holding volume of 350 gal. and a transfer capacity of 500 gpm.

In operation, at start-up, the fill valve 40 and venting valve 46 are opened, the pump motor 26 not being energized at that time. The collection tank 22 thus is filled to level "D" at which point fill valve 40 and venting valve 46 are closed to seal the tank 22, all of the sump valves 36A–36E also being closed at this time.

The pump motor 26 is energized with the outlet valve 32 opened, drawing liquid out of the collection tank 22, and returning it to the filtration equipment 16, until a predetermined vacuum level is sensed, i.e., 15 inches of vacuum. Valve 32 is then closed, with pump flow recirculated to the tank 22 via bypass 50.

Upon the liquid in any of the individual sumps 18A–18E reaching level A, the associated valve 36A–36E opens, and the vacuum in the collection tank 22 draws liquid with chips entrained therein from sump 18A–18E.

Upon the vacuum declining to a predetermined lower level, i.e., 8 inches of vacuum, the tank outlet valve 32 is reopened to transfer liquid to the filtration equipment 16.

The system can be shut down by opening all of the sump valves 36A–36E to pump all of the liquid to the filtration system 16, preparatory to another start-up.

The large capacity pump 26 is more reliable as the large clearances of such large capacity pumps minimize the incidence of jamming by the chips. Also, such large capacity pumps are constructed to be more durable, such that failures are rare.

The need to wire for pumps in each sump is eliminated. This arrangement is particularly suited to transfer lines, as draw pipes 20A–20E can be routed to each station, as the small sized sumps without pumps can be disposed beneath each wing base.

The filtration equipment can be remotely located from the sumps and central collection tank, as the liquid can be pumped substantial distances, i.e., on the order of 500 feet.

I claim:

1. A sump system for collecting liquid to be filtered in a filtration system from a plurality of locations, comprising:

a plurality of individual sumps arranged to receive liquid to be filtered at a respective one of said locations;

a sealed central collection tank and a series of draw pipes each extending to a respective sump and having one end extending to a lower level within a respective sump and an opposite end communicating with an upper region of said collection tank;

a liquid pump having an intake connected to a lower region of said collection tank and an outlet connected to said filtration system, operation of said pump generating a vacuum in said central collection tank to enable drawing liquid from each of said sumps through said draw pipes and into said sealed collection tank;

flow control means controllably causing said pump to direct liquid pumped from said sealed central collection tank into said filtration system;

vacuum sensing means for sensing the vacuum level in said sealed collection tank, said vacuum sensing means causing said flow control means to direct liquid pumped from said sump system collection tank into said filtration system whenever said sensed vacuum level in said sealed collection tank declines below a predetermined level.

2. The sump system according to claim 1 further including a valve in each draw pipe and a level control switch means at each sump causing opening of a respective valve upon liquid in said sump reaching a predetermined level.

3. The sump system according to claim 2 further including an outlet valve connected between said pump outlet and said filtration system and a bypass flow path before said outlet valve connecting said pump outlet to said collection tank, said outlet valve opened periodically to enable pumping of liquid from said collection tank to said filtration system.

4. The sump system according to claim 3 wherein said vacuum sensing means causes said outlet valve to be opened whenever said vacuum in said sealed collection tank declines below a predetermined level.

5. The sump system according to claim 1 wherein said filtration system supplies filtered liquid to each of said locations via an overhead supply header and further including a fluid connection and fill valve interposed between said sealed collection tank and said supply header, and a tank vent means controllably opened during start-up filling of said collection tank to allow filling of said sealed collection tank to a predetermined level at startup.

6. A method of collecting liquid from a plurality of locations to be filtered in filtration equipment, said method comprising:

disposing an individual sump at each location so as to receive said liquid to be filtered;

providing a single sealed collection tank and connecting all of said individual sumps with said sealed collection tank with draw pipes having one end extending into said sealed collection tank;

pumping liquid from said sealed collection tank back to said filtration equipment to allow drawing liquid from each sump into said sealed collection tank and back to said filtration equipment;

controlling communication of each draw pipe with said sealed collection tank by opening a valve whenever the liquid level reaches a predetermined level in a respective sump, said predetermined level above the level of said one end of each draw pipe; and maintaining a vacuum in said sealed collection tank within a predetermined range by appropriately controlling the pumping of liquid out of said sealed collection tank so as to maintain said vacuum level.

7. The method according to claim 6 further including the step of initially pumping liquid from said filtration equipment into said collection tank while temporarily venting said tank, sealing said collection tank while each of said draw pipes are closed, and then pumping liquid out of said collection tank to establish a predetermined vacuum therein, a respective draw pipe at each sump opened when liquid reaches a predetermined level therein.

\* \* \* \* \*